United States Patent Office 2,810,727
Patented Oct. 22, 1957

2,810,727

PROCESS OF PRODUCING N-ACYL-TRYPTOPHAN

Harold R. Snyder, Urbana, Ill., and John A. MacDonald, Elrose, Saskatchewan, Canada, assignors to Merck & Co., Inc., Rahway, N. J., a corporation of New Jersey No Drawing. Application January 14, 1954,
Serial No. 404,143

10 Claims. (Cl. 260—319)

This invention is concerned generally with the preparation of acryltryptophan compounds. More particularly it relates to a novel process generally applicable for the preparation of N-acyl-tryptophans utilizing the corresponding indole compound as starting material.

In accordance with the presently invented process, an indole compound having a hydrogen atom attached to the C-3 carbon atom (compound 1 hereinbelow) is reacted with an N-acylated aminoacrylic acid (compound 2) to produce the corresponding N-acyl-tryptophan (compound 3). This process can be chemically represented as follows:

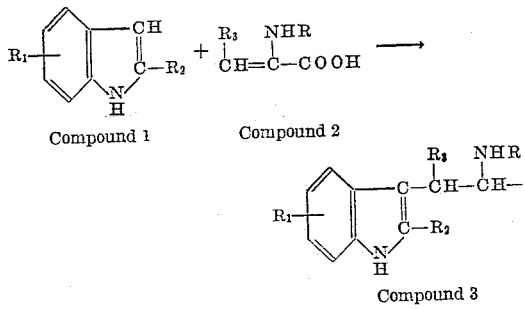

Compound 1        Compound 2

Compound 3 wherein R is acyl and $R_1$, $R_2$ and $R_3$ are hydrocarbon radicals or hydrogen.

The starting materials which can be utilized in this process are indole compounds wherein the C-3 position is free, that is those having a hydrogen atom attached to the C-3 carbon atom and which may have one or more hydrocarbon substituents such as alkyl, aryl or aralkyl, attached in the 2,4,5,6 and/or 7 positions of the benzene nucleus, as for example, indole, 4-methyl-indole, 5-methyl-indole, 6-methyl-indole, 5-ethyl-indole, 5-phenyl-indole, 4-benzyl-indole, and the like.

Although any N-acylated aminoacrylic acid can be employed in the reaction with the indole compound, it is ordinarily preferred to use an α-alkanoylamino-acrylic acid having less than eight carbon atoms in the alkanoyl radical, as for example, α-acetylamino-acrylic acid, α-propionylamino-acrylic acid, α-butyrylamino-acrylic acid, α-valerylamino-acrylic acid, as well as α-alkanoylamino-β-alkyl-acrylic acids such as α-acetylamino-β-methyl-acrylic acid, α-acetylamino-β-ethyl-acrylic acid, and the like.

Instead of adding an α-acylamino-acrylic acid to the reaction mixture it is also possible to form this compound in situ by charging to the reaction mixture an α,α-diacyl-amino-propionic acid since this compound reacts with carboxylic acids to form the corresponding α-acylamino-acrylic acid. The α,α-diacylamino-propionic acids which are ordinarily employed as starting materials include α,α-dialkanoylamino-propionic acids such as α,α-diacetyl-amino-propionic acid, α,α-dipropionylamino-propionic acid and the like.

The reaction is ordinarily conducted by heating the indole compound and the N-acylated-aminoacrylic acid together, under substantially anhydrous conditions, in the presence of a carboxylic acid anhydride as, for example, acetic anhydride, propionic anhydride, butyric anhydride, and the like. It is preferred to utilize, in conjunction with the carboxylic anhydride, an acidic catalyst, preferably the carboxylic acid corresponding to the carboxylic anhydride.

The reaction is ordinarily carried out by heating the reactants together at a temperature between about 50 and 150° C. for a period of approximately fifteen minutes to several hours, although higher or lower temperatures and shorter or longer reaction times may be employed if desired. The N-acyl-tryptophan compound is conveniently recovered from the reaction mixture by extraction with an aqueous alkaline solution. Alternatively, the reaction mixture can be heated with aqueous alkali thereby hydrolyzing the N-acyl radical to produce the corresponding tryptophan compound which precipitates on acidifying and cooling the aqueous hydrolysis mixture. The N-acyl-tryptophan compound or the tryptophan compound obtained by hydrolysis is readily purified if desired by recrystallization from a lower alkanol such as ethanol.

The following examples illustrate methods of carrying out the present invention but it is to be understood that these examples are given for purposes of illustration and not of limitation.

*Example 1*

Indole (1.17 g.) and α-acetamidoacrylic acid (1.29 g.) in a solution of 10 ml. of acetic acid and 3 ml. of acetic anhydride were heated in a nitrogen atmosphere for 70 minutes at 85° C. The solvents were removed in vacuo at about 30° C. The resulting dark residue was dissolved in 60 ml. of chloroform and extracted three times with 10 ml. portions of 20% aqueous potassium hydroxide. The alkaline extracts were washed with ether, cooled to 5° C. and acidified with hydrochloric acid. The precipitated material was filtered, washed with small quantities of cold water, and crystallized from aqueous ethanol to afford 750 mg. of N-acetyltryptophan M. P. 201–6° C. On recrystallization from ethanol the melting point was raised to 207–9° C.

*Analysis.*—Calcd. for $C_{13}H_{14}O_3N_2$: C, 63.4; H, 5.7; N, 11.4. Found: C, 63.3; H, 5.6; N, 11.4.

*Example 2*

A mixture of 1.3 g. α-acetamidoacrylic acid, 1.17 g. indole, 4.0 ml. of glacial acetic acid, and 1 ml. acetic anhydride was heated on a steam bath with stirring for about 15 minutes. The resulting clear, red solution was cooled below room temperature and mixed with 25 ml. of ether. The reaction mixture was then made alkaline by the addition of aqueous sodium hydroxide and more ether (30 ml.) added. The ether extract was withdrawn and washed with two portions of aqueous sodium hydroxide. The combined aqueous extracts were again washed with ether and after cooling were acidified with hydrochloric acid. The N-acetyltryptophan separated as an oil which crystallized upon cooling. The crude product was recrystallized from aqueous ethanol to afford 0.82 g. of substantially pure acetyltryptophan; M. P. 203–206° C.

*Example 3*

A mixture of 1.30 g. α-acetamidoacrylic acid, 1.17 g. indole, 4.0 ml. of glacial acetic acid and 1 ml. acetic anhydride was heated on a steam bath with stirring for about 15 minutes. The reaction mixture was cooled and made alkaline by adding 20 ml. of 30% aqueous sodium hydroxide. The alkaline solution was then heated under reflux for about 20 hours.

The reaction mixture was cooled and extracted with two small portions of ether to remove any unreacted starting materials. Activated charcoal was added to the residual aqueous solution and the suspension heated for a few minutes and filtered. The filtrate was cooled and adjusted to about pH 6.5 by addition of acetic acid. The solution was chilled at about 0–5° C. overnight. The crude product, a brown precipitate, was recovered by filtration and extracted with two portions of hot ethanol and one portion of hot water. The combined ethanol-water extracts were concentrated in vacuo to about 20 ml. then allowed to evaporate to dryness. The residue was dissolved in hot water, filtered, concentrated and allowed to stand overnight. The crude crystalline product was collected, washed with water and recrystallized from aqueous ethanol to afford 0.4 g. of substantially pure d,1-tryptophan; M. P. 261–5° C.

*Example 4*

Indole (1.5 g.) and α,α-diacetamidopropionic acid (1.88 g.) in a solution of 10 ml. acetic acid and 3 ml. of acetic anhydride were heated for 60 minutes at 95° C. in a nitrogen atmosphere. After the solvents were removed in vacuo the residue was dissolved in chloroform and extracted with 20% aqueous potassium hydroxide. The basic extracts were cooled to about 5° C., acidified with glacial acetic acid, filtered, and thoroughly extracted with ethyl acetate. Concentration of the ethyl acetate extracts in vacuo and trituration of the residue with aqueous ethanol afforded 70 mg. of N-acetyl-tryptophan: M. P. 201–4° C.

Various changes and modifications may be made in carrying out the present invention without departing from the spirit and scope thereof. Insofar as these changes and modifications are within the purview of the annexed claims, they are to be considered as part of our invention.

We claim:

1. The process of preparing an N-acyl-tryptophan compound which comprises reacting an N-acylated aminoacrylic acid with an indole compound having the following formula:

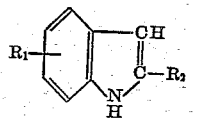

wherein $R_1$ and $R_2$ are radicals selected from the group consisting of hydrogen, phenyl, benzyl and lower alkyl radicals.

2. The process which comprises reacting indole with α-acylamino-acrylic acid in the presence of a carboxylic acid anhydride to produce N-acyl-tryptophan.

3. The process which comprises reacting indole with α,α-diacylamino-propionic acid in the presence of a carboxylic acid and its anhydride to produce N-acyl-tryptophan.

4. The process which comprises reacting 4-methylindole with α-acylamino-acrylic acid in the presence of a carboxylic acid anhydride to produce 4-methyl-N-acyl-tryptophan.

5. The process which comprises reacting 5-methylindole with α-acylamino-acrylic acid in the presence of a carboxylic acid anhydride to produce 5-methyl-N-acyl-tryptophan.

6. The process which comprises reacting 6-methylindole with α-acylamino-acrylic acid in the presence of a carboxylic acid anhydride to produce 6-methyl-N-acyl-tryptophan.

7. The process which comprises reacting indole with α-acylamino-β-methyl-acrylic acid in the presence of a carboxylic acid anhydride to produce β-methyl-N-acyl-tryptophan.

8. The process which comprises reacting indole with α-acetylamino-acrylic acid in the presence of acetic anhydride to produce N-acetyl-tryptophan.

9. The process which comprises bringing together, under substantially anhydrous conditions, indole, α-acetylamino-acrylic acid, acetic acid and its anhydride, and heating the resulting mixture at a temperature of about 50–150° C. thereby forming the corresponding N-acetyl-tryptophan.

10. The process which comprises reacting indole with α,α-diacetylamino-propionic acid in the presence of acetic acid and its anhydride to produce N-acetyl-tryptophan.

References Cited in the file of this patent

UNITED STATES PATENTS

| | | |
|---|---|---|
| 2,468,912 | Albertson et al. | May 3, 1949 |
| 2,531,595 | Albertson | Nov. 28, 1950 |
| 2,583,010 | Opie et al. | Jan. 22, 1952 |

OTHER REFERENCES

Journal Am. Chem. Soc., vol. 68, pp. 2105–6 (1946).
Journal Chem. Soc. (London) (1948) pp. 705–710.